(12) United States Patent
Larsen et al.

(10) Patent No.: US 12,276,955 B2
(45) Date of Patent: Apr. 15, 2025

(54) SYSTEMS, METHODS, AND MACHINE READABLE PROGRAMS FOR CONTROLLING A WATER UTILITY SYSTEM RESPONSIVE TO OBSERVED ACOUSTIC EMISSION

(71) Applicant: Grundfos Holding A/S, Bjerringbro (DK)

(72) Inventors: Jan Balle Larsen, Bjerringbro (DK); Poul Ejlertsen, Bjerringbro (DK); Nicolai Bæk Thomasen, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 0 days.

(21) Appl. No.: 17/100,527

(22) Filed: Nov. 20, 2020

(65) Prior Publication Data

US 2021/0157292 A1     May 27, 2021

(30) Foreign Application Priority Data

Nov. 25, 2019   (EP) ..................................... 19211266

(51) Int. Cl.
    *G05B 19/042*     (2006.01)
    *F04D 15/02*     (2006.01)
    (Continued)

(52) U.S. Cl.
    CPC ..... *G05B 19/0428* (2013.01); *F04D 15/0281* (2013.01); *F24D 19/1012* (2013.01);
    (Continued)

(58) Field of Classification Search
    CPC ........ G05B 19/0428; G05B 2219/2625; G05B 2219/37337; G05B 2219/37351;
    (Continued)

(56) References Cited

U.S. PATENT DOCUMENTS 8,862,273 B2 *   10/2014   Karr ....................... G05B 15/02
                                                                      381/71.1
9,311,909 B2 *   4/2016   Giaimo, III ........ G10K 11/1785
                       (Continued)

FOREIGN PATENT DOCUMENTS

AU      2015101659 A4 * 12/2015 ............. Y02B 30/78
CN      104251201 A    12/2014
               (Continued)

OTHER PUBLICATIONS

Machine translation of WO 2018/162291, publ Sep. 13, 2018.*
(Continued)

*Primary Examiner* — M. N. Von Buhr
(74) *Attorney, Agent, or Firm* — DeWitt LLP; Brian R. Pollack, Esq.

(57) ABSTRACT

A computer-implemented method for controlling one or more components of a water utility system, the water utility system comprising at least one pump assembly, the method comprising: receiving a user indication indicative of a user-perceived acoustic-noise induced discomfort experienced at least at a first location, measuring at least a first sound signal at said first location, determining, based on the measured first sound signal and based on at least one of a received user indication of a degree of the user-perceived acoustic-noise induced discomfort and a received first operational parameter of the pump assembly, the first operational parameter being representative of an operational condition of the pump assembly at the time of said measuring the first sound signal, one or more adjusted control parameters of the water utility system, and controlling the water utility system based on the determined adjusted control parameters.

26 Claims, 4 Drawing Sheets

(51) Int. Cl.
*F24D 19/10* (2006.01)
*G06Q 50/06* (2012.01)

(52) U.S. Cl.
CPC ..... *G06Q 50/06* (2013.01); *G05B 2219/2625* (2013.01); *G05B 2219/37337* (2013.01); *G05B 2219/37351* (2013.01)

(58) Field of Classification Search
CPC . G06Q 50/06; F04D 15/0281; F04D 15/0088; F04D 29/669; F24D 19/1012; Y02B 30/70; F04B 49/20; F04B 49/065; G06N 20/00
See application file for complete search history.

(56) References Cited

U.S. PATENT DOCUMENTS

| | | | | |
|---|---|---|---|---|
| 10,226,217 | B2* | 3/2019 | Dubin | A61B 5/0013 |
| 10,316,849 | B2* | 6/2019 | Munk | G01M 99/008 |
| 10,563,880 | B2* | 2/2020 | Ahuja | G06N 20/00 |
| 10,914,055 | B2* | 2/2021 | Kovscek | E03B 7/072 |
| 10,948,917 | B2* | 3/2021 | Saito | G05D 1/0274 |
| 11,013,467 | B2* | 5/2021 | Dubin | A61B 5/0077 |
| 11,085,437 | B2* | 8/2021 | Nielsen | F04B 49/20 |
| 11,221,613 | B2* | 1/2022 | Cella | G06N 3/0454 |
| 2003/0047008 | A1* | 3/2003 | Gopalakrishnan | G01F 1/05 73/861.79 |
| 2004/0190928 | A1* | 9/2004 | Tsunoda | G03G 15/50 399/91 |
| 2009/0092261 | A1* | 4/2009 | Bard | G06F 1/3203 381/71.1 |
| 2010/0299179 | A1* | 11/2010 | Alonso | G06Q 10/0637 280/727 |
| 2013/0226320 | A1* | 8/2013 | Berg-Sonne | G05D 23/1902 700/90 |
| 2014/0358291 | A1* | 12/2014 | Wells | G05B 15/02 700/276 |
| 2015/0097687 | A1* | 4/2015 | Sloo | H04L 12/2809 340/632 |
| 2015/0115610 | A1* | 4/2015 | Quinlan | F03D 7/042 290/44 |
| 2016/0116178 | A1* | 4/2016 | Vega | F24F 11/30 700/276 |
| 2016/0131383 | A1* | 5/2016 | Zhao | F24F 11/30 700/276 |
| 2016/0170998 | A1* | 6/2016 | Frank | G06F 16/337 707/748 |
| 2017/0103420 | A1* | 4/2017 | Ramasarma | G01S 19/39 |
| 2017/0241422 | A1 | 8/2017 | Munk et al. | |
| 2017/0248142 | A1* | 8/2017 | Munk | G01H 17/00 |
| 2018/0108339 | A1 | 4/2018 | Young et al. | |
| 2019/0008074 | A1 | 1/2019 | Chen | |
| 2019/0041077 | A1* | 2/2019 | Salsbury | G05B 5/01 |
| 2019/0041846 | A1* | 2/2019 | Cella | G05B 23/024 |
| 2019/0103182 | A1* | 4/2019 | Borshch | G06F 16/24575 |
| 2019/0174207 | A1* | 6/2019 | Cella | H04Q 9/00 |
| 2019/0278310 | A1* | 9/2019 | Lalanne | G05B 15/02 |
| 2019/0385583 | A1* | 12/2019 | Muggleton | H04R 1/1083 |
| 2020/0058083 | A1* | 2/2020 | Mifsud | G06Q 50/06 |
| 2021/0074283 | A1* | 3/2021 | Park | G10L 15/20 |
| 2021/0173969 | A1* | 6/2021 | Abbey | G06F 30/13 |
| 2021/0295618 | A1* | 9/2021 | Aubert-Moulin | G06F 3/04815 |
| 2022/0035899 | A1* | 2/2022 | Miche | B25J 13/06 |
| 2022/0199107 | A1* | 6/2022 | Ueda | G05B 23/0283 |

FOREIGN PATENT DOCUMENTS

| | | | | |
|---|---|---|---|---|
| CN | 107076155 A | | 8/2017 | |
| CN | 110382872 A | | 10/2019 | |
| JP | H5149616 | | 6/1993 | |
| JP | H5149616 A | | 6/1993 | |
| JP | 2019093921 A | * | 6/2019 | ............. Y02B 30/70 |
| KR | 100302386 B1 | | 9/2001 | |
| WO | WO-2012121680 A2 | * | 9/2012 | ............ F04B 49/065 |
| WO | 2015197141 A1 | | 12/2015 | |
| WO | WO-2016059112 A1 | * | 4/2016 | ............. F04D 13/06 |
| WO | 2018073054 A1 | | 4/2018 | |
| WO | 2018162291 A1 | | 9/2018 | |

OTHER PUBLICATIONS

JP-2019093921-A (Jun. 2019), translation of abstract.*
Chinese Office Action for Chinese Application No. 202011328433.1, dated Mar. 20, 2024, 7 pages.
Chinese Search Report for Chinese Application No. 202011328433.1, dated Mar. 18, 2023, 3 pages.

* cited by examiner

SYSTEMS, METHODS, AND MACHINE READABLE PROGRAMS FOR CONTROLLING A WATER UTILITY SYSTEM RESPONSIVE TO OBSERVED ACOUSTIC EMISSION

TECHNICAL FIELD

The present disclosure relates to a computer-implemented method for controlling a water utility system.

BACKGROUND

Water utility systems are installed in many structures, such as buildings. Water utility systems may include a variety of components including e.g. pipes, valves, boilers, pumps etc. At least some of the components of a water utility system can generate acoustic noise during normal operation. Acoustic vibrations may further be carried on, and amplified by various components of the water utility system and of the building structures to which these components are mechanically coupled. This may be particularly pronounced when the acoustic noise induces resonances of the components of the water utility system or of surrounding structures. Acoustic noise may result in discomfort or disturbance to people within a vicinity of the water utility system, e.g. to residents of a residential building where the water utility system is installed or to office workers working in an office building where the water utility system is installed.

Many parameters may influence the severity of the discomfort, such as the acoustic properties of the room in which a person experiences the discomfort, the auditory system of the person experiencing the discomfort, the structural surroundings with which the components of the water utility system are mechanically coupled, the presence of other sound sources, etc. Therefore, it has proven difficult to address acoustic-noise induced discomfort in an efficient manner.

SUMMARY

According to one aspect, disclosed herein are embodiments of a computer-implemented method for controlling one or more components of a water utility system, the water utility system comprising at least one pump assembly. Embodiments of the method comprise:
receiving a user indication indicative of a user-perceived acoustic-noise induced discomfort experienced at least at a first location,
measuring at least a first sound signal at said first location,
determining, based on the measured first sound signal and based on at least one of a received user indication of a degree of the user-perceived acoustic-noise induced discomfort and a received first operational parameter of the pump assembly, the first operational parameter being representative of an operational condition of the pump assembly at the time of said measuring the first sound signal, one or more adjusted control parameters of the water utility system, and
controlling the water utility system based on the determined adjusted control parameters.

Accordingly, embodiments of the method described herein control the water utility system responsive to a user indication that a noise discomfort is being perceived during operation of the water utility system rather than attempting to solve all potential acoustic noise related issues during manufacturing of e.g. the pump assembly. Moreover, embodiments of the method described herein control the water utility system based on a measured sound signal at a location where the discomfort has been experienced by the user in combination with a user indication of a degree of the noise discomfort and/or in combination with an obtained operational parameter of a pump assembly of the water utility system. This allows the acoustic noise to be reduced during runtime of the system and in a manner specific to the operational conditions of the system and/or specific to the degree of the experienced noise.

In particular, some embodiments, the method may determine correlations between the actual operational condition of the pump assembly and the objectively measured sound. This allows the method to verify whether the pump assembly and/or another component of the water utility system is likely the source of the acoustic noise and to determine adjustments to the control of the pump assembly or to another component of the water utility system that are suitable for reducing the acoustic noise and, hence, likely to reduce the experienced noise discomfort.

The process may receive the user input in a variety of ways. For example, embodiments of the process may be carried out by a suitably programmed or otherwise configured mobile device or by another data processing system that is suitably programmed to carry out the process. Accordingly, the process may receive the user input by means of a suitable program executed on the mobile device or on another data processing system. The program may be a noise reporting program, a water utility system control program or the like. The mobile device or other data processing system that carries out the process may provide a suitable user interface allowing the user to enter relevant information about the perceived acoustic noise, e.g. a degree of the perceived noise, a location where the noise is perceived, a time at which the noise is perceived, the type of noise perceived, and/or the like. The degree of the perceived noise may be a degree of perceived loudness, a degree of perceived sharpness, or another parameter indicative of a degree of an attribute of the perceived noise. The location may be identified as a location in a building, e.g. by designating a particular floor, room etc. and/or by specifying a location relative to the water utility system, e.g. by designating a distance from a component of the system, e.g. a distance from the pump assembly. The time at which the noise is perceived may be specified as a current date and time, as a time of day, as a day of the week and/or the like. In some embodiments, some or all of the information may be entered manually by the user. In some embodiments, at least some of the information may be determined automatically, e.g. by the mobile device or other data processing system that is used to enter the information. For example, the time of the perceived noise may be recorded by the mobile device or other data processing system as the time at which the process has been invoked or the time at which the input has been received by the process. Similarly, the location may be determined by the mobile device as the position of the mobile device at the time of reporting, e.g. using a suitable positioning system.

In some embodiments, receiving the user indication comprises receiving a descriptive characterization of the user-perceived noise discomfort and the determining is based on the received descriptive characterization. For example, the process may provide a user interface that allows the user to enter the descriptive characterization, e.g. as a free text input, as spoken input or the like. In such embodiments, the process may comprise a natural language processing module configured to analyze the descriptive characterization so as to extract one or more attributes of the perceived noise discomfort, in particular a degree of the noise, e.g. a degree of an attribute thereof. In other embodiments, the process may provide a user interface that allows the user to select one or more of a plurality of predetermined attributes, e.g. by ticking off the selected attributes in a list of selectable attributes. The attributes may for example include attributes indicative of the type of the experienced acoustic noise, e.g. by classifying the noise as "humming", "hammering", "sharp", and/or the like. Alternatively or additionally, the attributes may include attributes that indicate a degree of discomfort, e.g. on a predetermined scale that may range from "no discomfort" via "acceptable" to "very severe". Similarly degrees of other attributes of the perceive noise discomfort may be input in a similar manner, such as a degree of loudness, sharpness etc. The process may then use the selected attributes directly as characteristics of the perceived noise discomfort or the process may translate the selected combination of attributes into characteristics of the perceived noise discomfort, e.g. using a look-up table or a more complex set of translation rules.

In some embodiments, receiving the user indication may include receiving a user indication and information about a single occurrence of a perceived noise discomfort. Alternatively, receiving the user indication may include receiving a user indication and information about multiple occurrences of a perceived noise discomfort, e.g. occurrences at different locations and/or at different times, e.g. different times of day. Accordingly, the process may, based on the received information about multiple occurrences, measure multiple sound signals e.g. at respective locations and/or respective times. The locations and/or times of the measurements are preferably based on, e.g. match, the times and/or locations indicated by the received information about multiple occurrences. Additionally or alternatively, the process may, based on the received information about multiple occurrences, obtain information about operational parameters from multiple pump assemblies of the water utility system, e.g. pump assemblies located at different locations within a building, and/or operational parameters indicative of the operational conditions of one or more pump assemblies at different times. To this end the process may establish communication with multiple pump assemblies so as to read out their current operational parameters and, optionally, log information about historic operational parameters. The process may even establish communication with one or more pump assembly at different times so as to read out information about current operational parameters at different times.

It will be appreciated that the user indication may include additional or alternative information, such as information about the water utility system, e.g. the type and/or location of the pump assembly, information such as a serial number which identifies the pump assembly, information about the building or other mechanical structures in which the water utility system is installed, user information, etc.

Measuring at least the first sound signal at said first location may be performed by the same device that receives the user indication, e.g. by a mobile device, or by a dedicated sound measuring device communicatively coupled to the data processing system. The sound signal may be measured by a suitable microphone, e.g. by an internal microphone of the mobile device or by a separate microphone connectable to the mobile device or to another data processing system. The sound signal may represent a measurement over a suitable period of time, e.g. 1 s or multiple seconds or even one minute or more. It will be appreciated that a suitable duration of the measurement may depend on the nature of the noise. The duration may be predetermined, automatically selected or user selected. An automatic selection may be based on the received user input about the characteristics of the perceived noise discomfort and/or dynamically selected based on a real-time analysis of the measured sound signal.

In some embodiments, the process may include measuring multiple sound signals, e.g. at respective times and/or at respective locations and or under different operational conditions of the pump assembly. Accordingly, the process may determine correlations between sound signals measured at different times and/or correlations between sound signals measured at different locations within a building and/or other types of correlations, e.g. between sound signals measured under different operational conditions.

In particular, in some embodiments, the method comprises:
measuring at least a second sound signal at said first location subsequent to said measuring the first sound signal,
optionally obtaining at least one second operational parameter of the pump assembly representative of an operational condition of the pump assembly at the time of said measuring the second sound signal, wherein determining the one or more adjusted control parameters of the water utility system is further based on said measured second sound signal and on the at least one first operational parameter and/or the obtained at least one second operational parameter. For example, in some embodiments the determining may comprise processing the measured second sound signal and said obtained at least one first and/or second operational parameter to determine a correlation between the operational condition and the measured second sound signal. The at least one second operational parameter may be the same parameter(s) as the at least one first operational parameter, but representing the operational condition of the pump assembly at a different time. Alternatively the at least one second operational parameter may only include some of the at least one first operational parameter and/or include one or more additional or alternative parameters. Accordingly, the process may determine correlations between the operational condition and sound signals measured at different times. It will be appreciated that, when the first and the second sound signals are measured within a sufficiently short period of time during which the operational condition of the pump assembly does not change significantly, it may be sufficient to only obtain the at least one first operational parameter.

Alternatively or additionally, some embodiments of the method may comprise:
measuring at least one additional sound signal at a second location, different from the first location,
optionally obtaining at least one supplemental operational parameter of the pump assembly representative of an operational condition of the pump assembly at the time of said measuring the at least one additional sound signal,
wherein determining the one or more adjusted control parameters of the water utility system is further based on the at least one additional sound signal measured at the second location and, optionally, on the obtained at least one supplemental operational parameter. For example, in some embodiments the determining may comprise processing the at least one additional sound signal measured at the second location and the obtained first operational parameter and/or the obtained supplemental operational parameter to determine a correlation between the operational condition and the at least one additional sound signal measured at the second location. The at least one supplemental operational parameter may be the same parameter(s) as the at least one first operational parameter but indicative of the operational condition at a different time. Alternatively the at least one supplemental operational parameter may only include some of the at least one first operational parameter and/or include one or more additional or alternative parameters. Accordingly, the process may determine correlations between the operational condition and sound signals measured at different locations. It will be appreciated that, when the first and the additional sound signals are measured within a sufficiently short period of time during which the operational condition of the pump assembly does not change significantly, it may be sufficient to only obtain the at least one first operational parameter.

Measuring multiple sound signals at different times and/or locations thus allows the process to determine correlations between the measured sound signals and other information, in particular the operational conditions of a pump assembly of the water utility system, and to use the determined correlations in determining suitable parameters for reducing the acoustic noise. Measuring multiple sound signals at different times and/or locations may be particularly useful in situations where the exact source of the acoustic noise is unknown or uncertain, e.g. when the water utility system includes multiple components, e.g. multiple pump assemblies, that may be the origin of the perceived noise discomfort. The multiple measurements may aid the process in determining which pump assembly to determine adjusted control parameters for. Similarly, multiple measurements may allow the process to determine multiple alternative sets of adjusted parameters that may be applied at different times, e.g. at different times of day or when the user stays at different locations within a building, etc.

In some embodiments, the method comprises:
measuring the first sound signal while the pump assembly is operated based on an initial set of operational parameters,
controlling the pump assembly to operate based on a set of preliminarily changed operational parameters, and
measuring at least one additional sound signal while the pump assembly is operated based on the preliminarily changed operational parameters,
and wherein determining the one or more adjusted control parameters of the water utility system is further based on the at least one additional sound signal and on the set of preliminarily changed operational parameters.

In particular controlling the pump assembly may comprise preliminarily changing one or more control parameters of the pump assembly so as to cause the pump assembly to operate based on preliminarily changed operational parameters.

The determination of the resulting adjustment of the control parameters to be affected may thus be based on the first and the at least one additional sound signals and on the corresponding initial and preliminarily changed operational parameters.

It will be appreciated that the process may comprise measurement of yet further sound signals based on yet further preliminary changed operational parameters. The preliminary change of the operational parameters may be selected in a deterministic or random manner, in particular so as to allow exploring of a state space of the pump assembly.

The first and additional sound signals may be measured as discrete measurements or as a single continuous measurement of a combined sound signal where the first sound signal constitutes an initial portion of the combined sound signal and the additional sound signal constitutes a subsequent portion of the combined sound signal. For example, during the continuing measurement, the operational parameters may be changed in discrete steps or in a gradual manner, e.g. by gradually changing the operational parameter during the continuous measurement. For example, the process may include operating the pump assembly at different speeds, e.g. gradually or discretely varying speeds an measuring sound signals while the pump assembly is operated at the different speeds.

The process may obtain at least the first operational parameter by the user entering a parameter value of the first operational parameter. To this end, the user may read the parameter value on a display of the pump assembly and manually enter the read parameter value into a mobile device or other data processing system. Alternatively, at least the first operational parameter may be received from the pump assembly e.g. by wired or wireless communication with the pump assembly. To this end, the mobile device or other data processing system performing the method may establish a direct or indirect communications link with the pump assembly and receive one or more operational parameters of the pump assembly. Accordingly, the mobile device or other data processing system carrying out an embodiment of the method described herein may include a data communications interface, such as a wired or wireless communications interface. Examples of a wireless communications interface include a radio-frequency communications interface, such as a Bluetooth interface, a Wifi interface, of the like. Other examples include a near-field communications interface or another type of contactless communications interface. The pump assembly may thus also include a corresponding data communications interface and be configured to transmit one or more operational parameters to the mobile device or other data processing system. The communication of the operational parameters may be a direct communication from the pump assembly to the mobile device or an indirect communication. For example, the pump assembly may communicate operational parameters to a remote host system and the mobile device may receive the operational parameters from the remote host system.

For example, the mobile device or other data processing system may be configured, upon receipt of the user indication about a perceived acoustic-noise induced discomfort, instruct the user to move a microphone of the mobile device or other data processing system to a location where the noise discomfort is being perceived. Then the mobile device or other data processing system may initiate the measurement of the sound signal. The mobile device or other data processing system may further establish communication with the pump assembly and receive the operational parameters. To this end, the mobile device may instruct the user to move the mobile device within a communication range of the pump assembly or to otherwise establish a wireless or wired connection with the pump assembly. Preferably the operational parameters are obtained concurrently with the measurement or at least at a time similar to the time of measurement of the first sound signal and while the noise discomfort is being perceived so as to ensure that the measured first sound signal and the obtained operational parameters are representative of the operational condition of the pump assembly at the time of the measuring of the first sound signal and at the time of a perceived noise discomfort.

Alternatively, if the pump assembly includes a storage device for logging operational parameters, the information about the operational parameters at the time of the measurement of the first sound signal may be obtained from the log at a later point in time. Yet alternatively, if the pump assembly communicates operational parameters to a remote host system and the remote host system includes a storage device for logging operational parameters, the information about the operational parameters at the time of the measurement of the first sound signal may be obtained from the log at a later point in time.

Examples of operational parameters of a pump assembly that may be useful for determining a correlation between the operational condition and the measured first sound signal and for determining one or more adjusted control parameters of the water utility system include: a pump speed, a valve setting, a voltage and/or frequency of the supplied electrical power, a switch frequency, a modulation pattern, and/or the like.

Embodiments of the method disclosed herein determine, based on the measured first sound signal and on said obtained first operational parameter and/or a user indication of a degree of the perceived noise, one or more adjusted control parameters of the water utility system. To this end, the process may include one or more sound signal processing steps, such as filtering, frequency analysis, more advanced signal analysis, and/or the like. The sound signal processing may e.g. result in one or more attributes representative of the measured sound signal. In some embodiments, the attributes include one or more of the following: one or more sound levels, one or more dominant frequency bands, one or more harmonic families, one or more sideband effects etc. In some embodiments, the attributes include additional or alternative attributes, such as one or more sound quality metrics. Accordingly, in some embodiments, the signal processing comprises the computation of one or more sound quality metrics, e.g. loudness, sharpness, roughness, fluctuation strength, tone-to-noise etc. to quantify characteristics of the measured first sound signal. Thus, the signal processing may comprise a feature extraction process for extracting and quantifying detailed acoustic characteristics of the measured first sound signal.

In some embodiments, determining the one or more adjusted control parameters of the water utility system comprises processing the measured first sound signal and said obtained first operational parameter and/or the received user indication of a degree of the perceived noise to determine a correlation between the operational condition of the pump assembly and the measured first sound signal and/or a correlation between the perceived noise discomfort and the measured first sound signal, and determining the one or more adjusted control parameters of the water utility system based on said processing. The determination of a correlation between the operational condition and the measured sound signal may include the determination of corresponding parameters, e.g. of a rotational speed of the pump and a dominant frequency of the measured sound signal. The correlation may also include a correlation between a change of the measured sound signal over time and a corresponding change of the operational parameter and/or the degree of the perceived noise over time.

In some embodiments, determining the one or more adjusted control parameters of the water utility system comprises processing the measured first sound signal to extract one or more features and/or signatures of the first sound signal. In particular, the processing may include applying one or more feature extraction algorithms to the measured first sound signal. The process may further comprise mapping the extracted one or more features and/or signatures to one or more classes of noise. In one embodiment, the classes of noise may include hydraulic noise, motor noise, resonance noise, and/or the like. Accordingly, the classes of noise may relate to a classification of the noise by the source of noise and/or by the type of noise. The process may further map the one or more classes of noise to which the extracted features and/or signatures have been mapped to one or more candidate control parameters to be adjusted in order to reduce the noise. Optionally, this mapping may further comprise determining an estimated degree of adjustment for the candidate control parameter(s). The mapping to the one or more control parameters and/or the determination of the estimated degree of adjustment may further depend on the obtained first operational parameter, i.e. on the current operational condition of the pump assembly.

Each or both of the above mappings may be made by means of a look-up table or a suitable mathematical model, such as a rule-based model or a machine-learning model. For example, a machine-learning model may be trained to map sound signals to features and/or to map features to noise classes and/or to candidate parameters to be adjusted. In some embodiments the above mappings may be performed by a multi-layer neural network or another suitable machine learning model.

In some embodiments, determining the one or more adjusted control parameters may be based on additional information, e.g. information input by the user, information about a location at which the discomfort is being perceived, or the like. The information input by the user may include a characterization of the acoustic noise as described herein. The location at which the discomfort is being received may be expressed as a distance to the pump assembly or to another component of the water utility system or in a different manner. For example, the additional information may include information about a location at which the discomfort is being perceived, e.g. a location relative to the pump assembly, such as a distance relative to the pump assembly. The additional information may e.g. be used during a classification of the noise based on extracted features of the sound signal. For example, when the distance to the pump assembly is relatively short, the noise is likely airborne, while noise perceived at a larger distance from the pump assembly or other likely source of the noise is likely structure-borne or fluid borne.

In some embodiments, determining the one or more adjusted control parameters may be based on one or more parameter adjustment rules or models, e.g. on a rule-based model, a decision tree, on an expert system and/or a machine-learning model such as a neural network and/or another type of artificial intelligence system. For example, an artificial intelligence system may receive a representation of the measured sound signal and the obtained operational parameters and/or indication of the degree of the perceived noise and, optionally, additional information as inputs, and provide a set of control parameter values as an output. For example, a machine learning process may be trained to determine the control parameters based on a set of training examples. Each training example may include a measured sound signal, corresponding operational parameters of a pump assembly and, optionally, additional information. Each training example may additionally include a set of control parameters that have been determined to provide a reduction of the perceived acoustic-noise induced discomfort under the circumstances represented by the measured sound signal and the operational parameters of the respective training example. The latter may be determined from feedback received by the process from the user, e.g. in the form of an indication of a change of the level of the perceived discomfort after the adjustment has been implemented. The above data may e.g. have been collected in real-life installations during previous efforts to reduce acoustic noise. The data may be used to train a machine-learning model, e.g. a neural network, using training algorithms known as such in the art.

In some embodiments, the process may communicate the measured first sound signal and/or one or more attributes of the measured first sound signal to a remote host system. For example, the process may communicate one or more results of a sound processing step performed on the measured sound signal to the remote host system. Additionally, the process may communicate additional data such as user feedback and/or information about the adjustments to the control of the system to the remote host system. Yet further, in embodiments where the process includes measurement of additional sound signals, the process may communicate the additional sound signals and/or determined attributes thereof and/or associated additional data to the remote host system. Accordingly, the remote host system may collect data from multiple water utility systems and use the collected data as training examples for training an updated machine-learning model for use in subsequent determinations of adjusted control parameters. The remote host system may thus refine the best actions (policy) given the feedback across multiple installations/systems. This refinement may be done automatically, e.g. using machine learning, or at least partly based on user input. The remote host system may be a suitably programmed server computer or other data processing system, such as a distributed data processing system, a virtual machine, etc. The remote host system may thus receive corresponding data from multiple mobile devices and/or data associated with multiple users and/or multiple water supply systems. The remote host system may apply a suitable machine-learning method, such as reinforcement learning, to train an updated machine-learning model given the input and feedback across multiple systems and/or users. The remote host system may then transmit an updated machine-learning model to the mobile device for future use by the mobile device when analysing a subsequent sound signal. Alternatively, in embodiments where the model is applied by the remote host system, the remote host system may not need to transmit the updated model to the mobile device but merely apply the updated model responsive to receiving a subsequent set of inputs. In some embodiments, the refined best actions (policy) given the feedback across multiple installations/systems may also be used in defining default parameter settings for the control parameters to be used when manufacturing or otherwise configuring pumps.

Generally, the determining of adjusted control parameters may be based on stored data indicative of known correlations between operational conditions and sound signals. It will be appreciated that a number of different models may be employed, including hybrid models that include one or more machine-learning components and other, e.g. rule-based, components. In some embodiments, the model may include a machine-learning classification model that maps extracted features from the measured sound signal and, optionally, operational parameters of the pump system to a selected one of a number of predetermined classes of control strategies. Each control strategy may be defined by, or otherwise be associated with one or more control parameters. The training of the machine-learning model may be performed as supervised learning. In some embodiments, the machine-learning model may be trained using an reinforcement learning method. A reinforcement learning method may use the degree of the perceived noise as a reward feedback.

Generally, many adjustable control parameters of a pump assembly and/or of other components of a water utility system influence the noise generated by the water utility system. Accordingly, various embodiments of the process described herein may control different types of control parameters, including one or more control parameters for controlling operation of the pump assembly and/or control parameters for controlling operation of one or more other components of the water utility system. Examples of control parameters that may be adjusted by some embodiments of the process described herein include one or more of the following: a pump speed, a valve setting, a voltage and/or frequency of a drive current for driving a pump motor, a control mode of the pump assembly, a parameter indicative of a selected control strategy, and/or the like.

In some embodiments, the method comprises determining at least a first set of adjusted control parameters and a second set of adjusted control parameters. Controlling may thus comprise selecting one of the first and second sets of control parameters, e.g. conditioned on one or more of: a user input, a time of day, a day of week, an operational mode of the water utility system. For example, the process may determine two or more alternative adjustments of the control parameters and the user may be given the option of selecting one of the alternatives. To this end, the process may allow the user to tentatively try each of the alternative adjustments and then select the adjustment that results in the lowest perceived discomfort as a final adjustment. Alternatively, the process may automatically adjust the control parameters of the water utility system. Alternatively or additionally, the process may determine multiple alternative sets of control parameter values and selectively control the water utility system at different times based on respective ones of the determined alternative sets. For example, the process may result in one set of control parameters that results in a lowest perceived discomfort in a bedroom of a building and select this set at night when the user is likely to stay in the bedroom. At other times of day, the process may select a different set of control parameters, e.g. one that results in a lower perceived noise discomfort at other locations of the building and/or a set that is preferable for other reasons, e.g. to increase performance of the water utility system, save energy and/or the like. In some embodiments, the process may create a plurality of user-specific operational profiles, each having respective sets of control parameters. The process may allow the user to manually select individual ones of the profiles and/or provide a mechanism for automatically switching between different user profiles, e.g. based on the time of day, day of week, an operational state of the water utility system, and/or the like. A manual selection may be done via a user interface of the pump assembly, a remote control, a central control unit, etc.

In some embodiments, the process receives feedback from the user, e.g. responsive to controlling the water utility system based on the determined control parameters. The feedback may e.g. be in the form of a user input, e.g. a user selection among two or more options. The user feedback may be indicative of a degree of the perceived noise or of a change in the degree of the perceived noise. For example, after having adjusted the control parameters, the process may request user feedback as to whether the perceived noise discomfort has been improved, gotten worse or remained unchanged. Such user feedback may allow the process to arrive at an optimal choice of control parameters in an iterative manner, e.g. using reinforcement learning or another suitable adaptive strategy. To this end, according to some embodiments, the method comprises: receiving a user indication indicative of a user-perceived change of the noise discomfort experienced at least at the first location; and optionally repeating the measuring, obtaining, determining and controlling responsive to the received user indication. Accordingly, even if acoustic noise cannot entirely be avoided, the process allows the noise to at least be adapted to individual sound quality preferences of the user.

Alternatively or additionally, the received user feedback may be used to create or at least to supplement a set of training examples for training a machine-learning model configured to determine adjusted control parameters as described herein. In particular, the measured first sound signal, the obtained operational parameters, the determined adjusted control parameters and the user feedback may together form a training example for use in training a subsequent machine learning model.

Generally, as the adjustment of the control parameters is i.a. based on initial user input and/or user feedback, the adjustment of the control parameters may be based on one or more individual parameter adaptation rules, e.g. an individual user metrics, defined for the individual user based on the input and/or feedback. In particular, the process may implement a personalized active control of the pump assembly based on the user input and/or feedback.

Embodiments of the water utility system include a pump assembly. Some embodiments of a pump assembly include a pump and a motor, such as an electric motor, and a control circuit for controlling the motor. Some embodiments of the water utility system include further components, such as pipes, valves, reservoirs, boilers, etc. In some embodiments, the water utility system comprises two or more pump assemblies; wherein obtaining comprises obtaining respective operational parameters from each of the pump assemblies and wherein determining adjusted control parameters comprises determining adjusted control parameters for at least one, such as at least two of said pump assemblies. Accordingly, the process may determine which of a plurality of pump assemblies is likely the origin of the perceived noise discomfort, e.g. by determining a strongest correlation between the operational condition of said pump assembly with the measured sound signal(s). Moreover, the process may reduce acoustic noise related to interference between the operation of the multiple pump assemblies.

In some embodiments, the mobile device or other data processing system carrying out an embodiment of the method described herein, may communicate the determined adjusted control parameters to a control circuit for controlling the water utility system, e.g. via a wired or wireless data communications connection. To this end, the mobile device or other data processing system performing the method may establish a direct or indirect communications link with the pump assembly and/or with another component of the water utility system so as to transmit one or more adjusted control parameters to the pump assembly or other component and to cause the pump assembly or other component to operate based on the transmitted control parameters. Accordingly, the mobile device or other data processing system carrying out embodiments of the method described herein may include a data communications interface, such as a wired or wireless communications interface. Examples of a wireless communications interface include radio-frequency communications interface, such as a Bluetooth interface, a Wifi interface or the like. Other examples include a near-field communications interface or another type of contactless communications interface. The pump assembly or other component may thus include a corresponding data communications interface and be configured to receive adjusted control parameters transmitted by the mobile device or other data processing system. In some embodiments, the adjusted control parameters are communicated from the mobile device to a remote host system which, in turn, communicates the adjusted control parameters to the pump assembly or other part of the water utility system.

It is noted that features of the various embodiments of a computer-implemented method described above and in the following may be implemented at least in part in software or firmware and carried out on a data processing system or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure relates to different aspects, including the method described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, another aspect disclosed herein relates to embodiments of a data processing system configured to perform the acts of the method described herein. To this end, the data processing system may have stored thereon program code configured, when executed by the data processing system, to cause the data processing system to perform the acts of the method described herein. In some embodiments, the data processing system may include a mobile device, in particular a portable data processing device, such as a tablet computer or a mobile phone. The mobile device may include a microphone for measuring the sound signal and/or a data communications interface for communicating with the pump assembly and/or other component of the water utility system. The mobile device may be suitably programmed, e.g. by an app or other form of software, to perform an embodiment of the process described herein, either alone as a stand-alone device or as part of a distributed data processing system, e.g. as a client terminal of a client-server system or as a client terminal of a cloud-based architecture.

Yet another aspect disclosed herein relates to embodiments of a computer program configured to cause a data processing system to perform the steps of the computer-implemented method described above and in the following. A computer program may comprise program code means adapted to cause a data processing system to perform the steps of the computer-implemented method disclosed above and in the following when the program code means are executed on the data processing system. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
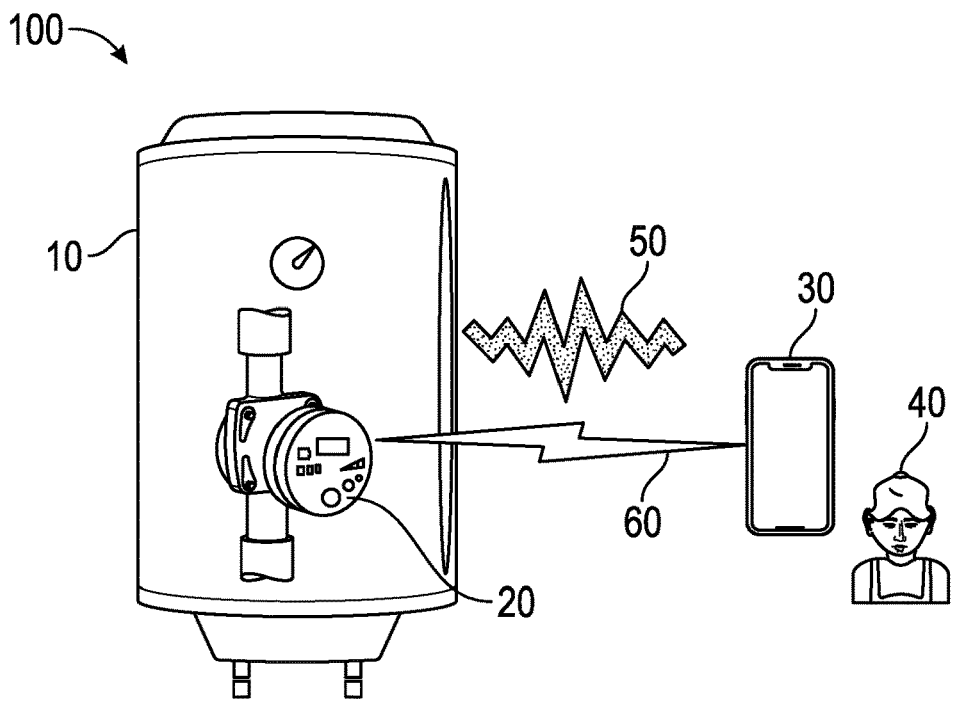
FIG. 1 schematically illustrates a water utility system and a mobile device communicatively coupled to the water utility system and configured to control the water utility system.

FIG. 1 schematically illustrates a water utility system, generally designated by reference numeral 100, and a mobile device 30 communicatively coupled to the water utility system via communications link 60 and configured to adjust control of the water utility system. The water utility system 100 includes a pump assembly 20 and other components, in this example illustrated by a water boiler 10. Though not explicitly shown in FIG. 1 for ease of illustration, it will be appreciated that embodiments of a water utility system typically include a number of alternative or additional components, such as valves, meters, additional pump assemblies, pipes, filter systems, and/or the like.

The mobile device 30 may e.g. be operated by a technician 40 or by a user of the water utility system. While the mobile device 30 is illustrated as a mobile phone, it will be appreciated that embodiments of a water utility system may be controllable by other types of data processing systems, such as other types of mobile devices, e.g. a suitably programmed tablet computer or other type of portable data processing device. It will further be appreciated that a water utility system may be controllable by more than one mobile device or other data processing system. For example, each service technician or even each user may be provided with a mobile device. It will further be appreciated that the mobile device 30 does not need to be operable for controlling only a single water utility system but may instead be operable to control different water utility systems based on indications of perceived acoustic-noise induced discomfort and based on measured sound signals as described herein.

The mobile device 30 is configured to receive an indication of a perceived acoustic-noise induced discomfort, such as including an indication of a degree of the perceived noise discomfort, e.g. via a user-interface of the mobile device. The mobile device 30 is further configured to measure a sound signal 50, in particular a sound signal representing the acoustic noise originating from the water utility system 100, at a location where the acoustic-noise induced discomfort has been perceived. Moreover, the mobile device 30 is configured to establish a communications link 60 with the pump assembly 20 so as to receive, from the pump assembly via the communications link 60, at least one operational parameter of the pump assembly representative of an operational condition of the pump assembly at the time of said measuring the sound signal. Examples of operational parameters include a pump speed, a voltage and/or frequency of a drive current, an operational mode and/or other settings, etc. The mobile device 30 is further configured to determine, based on the measured sound signal and on the received operational parameter and/or indication of a degree of the perceived noise, one or more adjusted control parameters of the water utility system. The mobile device 30 is further configured to control the pump assembly based on the determined adjusted control parameters, e.g. by transmitting the adjusted control parameters to the pump assembly via the communications link 60, so as to cause the pump assembly to operate based on the adjusted control parameters. It will be appreciated that the mobile device may be configured to control other components of the water utility system, e.g. by determining adjusted control parameters for such other components and by transmitting the adjusted control parameters to the other components. To this end, the mobile device may establish respective communications links with the other components of the water utility system. Alternatively, the mobile device may communicate the adjusted control parameters to the pump assembly 20 or to a central control unit (not shown) of the water utility system which may then forward the control parameters to the relevant components to which the adjusted control parameters pertain, or control the other components based on the adjusted control parameters.

Figure 2:
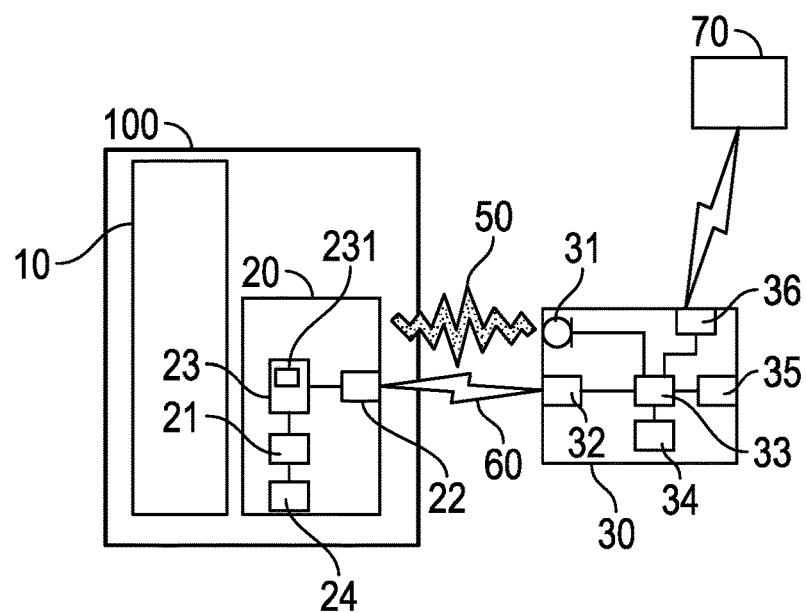
FIG. 2 schematically illustrates a block diagram of a water utility system and a mobile device communicatively coupled to the water utility system and configured to control the water utility system.

FIG. 2 schematically illustrates a block diagram of a water utility system and a mobile device communicatively coupled to the water utility system and configured to control the water utility system, e.g. the mobile device and water utility system of FIG. 1. The water utility system 100 comprises a pump assembly 20 and additional components 10, such as valves, meters, additional pump assemblies, pipes, boilers, filter systems, and/or the like. The pump assembly comprises a motor 21 and a pump 24 driven by the motor. The pump assembly further comprises a motor controller 23 for controlling operation of the motor 21. The motor controller may e.g. include a suitably programmed microprocessor and/or other control circuitry. The motor controller comprises a memory 231 or other suitable circuitry storing or otherwise representing one or more control parameters based on which the motor is controlled. The control parameters may include one or more of the following: a control mode, a speed of the motor, one or more control voltages, frequencies and/or the like of a control current/signal, and/or the like. The pump assembly further comprises a communications interface 22 which may be a wired or wireless interface. For example, a wired interface may include an electrical connector, such as a USB port for establishing a wired communications interface with an external device such as with the mobile device 30. Examples of a wireless communications interface may include a radio transceiver, e.g. a Bluetooth transceiver a Wifi adapter, or the like. Other examples of wireless communications interfaces include an infrared interface, a near-field communications interface, and/or the like.

The mobile device 30 comprises a communications interface 32, such as a wired or wireless communications interface configured to establish a communications link 60 with the communications interface 22 of the pump assembly. Accordingly, a wired interface may include an electrical connector, such as a USB port for establishing a wired communications interface with the communications interface 22 of the pump assembly. Examples of a wireless communications interface may include a radio transceiver, e.g. a Bluetooth transceiver. Other examples of wireless communications interfaces include an infrared interface, a near-field communications interface, and/or the like. The communications link 60 may be a direct communications link or an indirect communications link, e.g. via a local network. The mobile device 30 further comprises a microphone 31 or other suitable transducer for measuring sound signals. The microphone may be a built-in microphone of the mobile device. Alternatively, the microphone may be an external microphone connectable to the mobile device. The mobile device further comprises a user-interface 35, such as a touch screen or another type of display and/or other types of devices for receiving user inputs, such as physical buttons, a pointing device, such as a mouse, a touch pad, a camera for capturing user gestures, and/or the like. The mobile device further comprises a processing unit 33, such as a suitably programmed microprocessor, a CPU and/or the like. The processing unit is communicatively coupled to the microphone, the communications interface and the user interface. The processing unit 33 is programmed to perform some or all steps of an embodiment of the process described herein. To this end, the mobile device comprises a memory 34 for storing program code, such as one or more apps, and for storing data, such as for storing recorded sound signals and/or received operational parameters.

In some embodiments, the mobile device 30 may further be configured to communicate with a host system 70, e.g. via a cellular telecommunications network or via a suitable computer network, such as the internet. To this end, the mobile device may include a suitable radio interface 36. The mobile device 30 may communicate measured sound signals and/or received operational parameters and/or user feedback information to the remote host system 70. The remote host system may be a suitably programmed server computer or other data processing system, such as a distributed data processing system, a virtual machine, etc. The remote host system 70 may analyse the information received from the mobile device 30 and return adjusted control parameters to the mobile device which may then forward the adjusted control parameters to the pump assembly 20 via communications link 60. In other embodiments, the mobile device 30 may be operated in a stand-alone mode, where the mobile device itself performs the analysis of the measured sound signal, the operational parameters and the user feedback and itself determines the adjusted control parameters.

Figure 3:
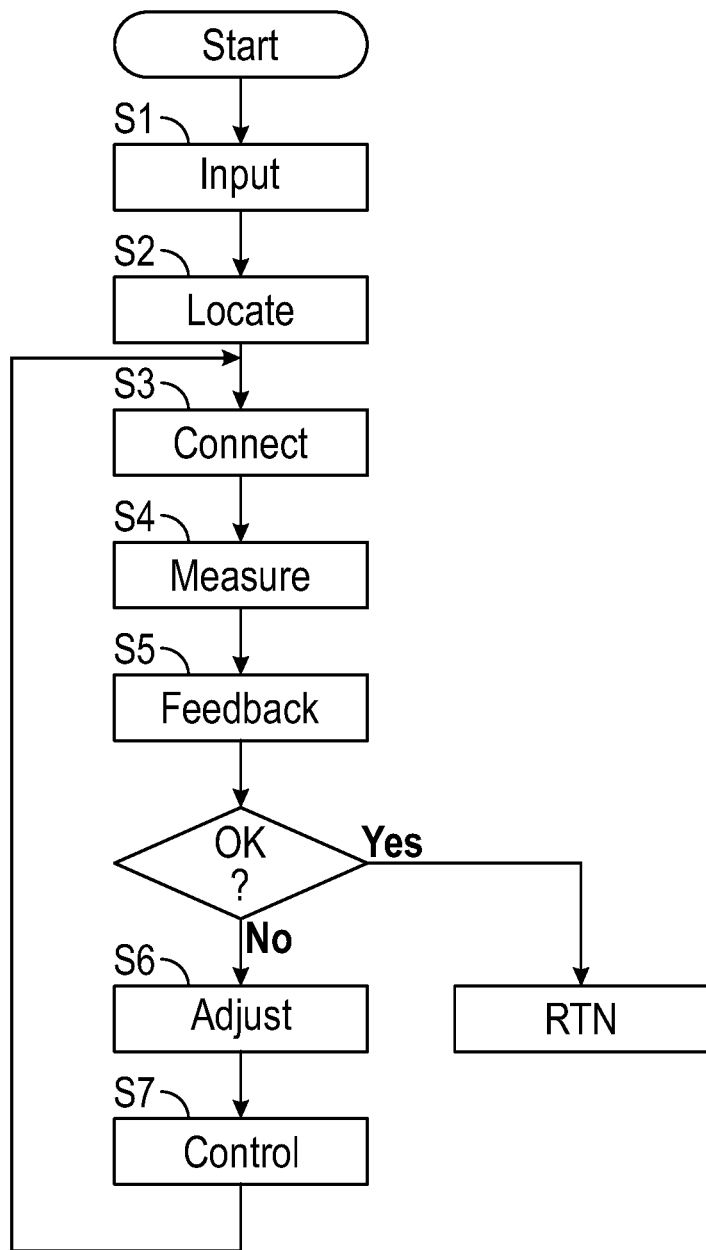
FIG. 3 illustrates a process of controlling a water utility system.

Regardless of whether the mobile device 30 or a remote host system 70 performs the data analysis and determination of the adjusted control parameters, the mobile device 30 may still be configured to communicate with a host system 70 and communicate the obtained data to the remote host system for use by the host system in creating improved data analysis models, e.g. by implementing a machine learning process. FIG. 3 illustrates a process of controlling a water utility system, e.g. a process performed by the mobile device of FIG. 1 or 2 for controlling the water utility system of FIG. 1 or 2.

In initial step S1, the process receives a user indication indicative of a user-perceived acoustic-noise induced discomfort experienced at least at a first location. For example, a user of the mobile device may invoke an app on the mobile device. The process may receive additional information about the acoustic-noise induced discomfort, e.g. indicative of a severity or other degree of the perceived discomfort, the type of acoustic noise, a location at which the noise is perceived, the time at which the noise occurs, and/or the like.

In step S2, the process requests the user to position the mobile device at a location where the acoustic-noise induced discomfort is being perceived. When the user has positioned the mobile device at said location, the user may confirm the location, e.g. by pressing a button on the mobile device.

In step S3, the mobile device establishes communication with a pump assembly of the water utility system and receives operational parameters from the pump assembly. To this end, the mobile device may determine whether a pump assembly is within communication range of the mobile device and establish connection with said pump assembly. If multiple pump assemblies are within communication range the mobile device may establish communication with all of them and receive operational parameters from all pump assemblies within communication range. If no pump assembly is in communication range (or if the pump assembly that is suspected to be the cause for the noise discomfort is not within communication range), the mobile device may instruct the user to initially move the mobile device to a location within communication range of the pump assembly so as to be able to receive the operational parameters of the pump assembly before returning to a location where the sound measurement is to be performed.

In step S4, the mobile device records audio for a period of time, e.g. for a predetermined period of time or for a user-controllable period of time, such as for a number of seconds or even for a number of minutes. In some embodiments, one or more of steps S2 through S4 may be repeated, e.g. at different times of day or where the mobile device is positioned at different locations when measuring the sound signal, or in order to receive operational parameters from multiple pump assemblies positioned at different locations. Accordingly, the process acquires one or more sets of data including respective sound signals and associated operational conditions and additional information, such as user input, location information, time information etc.

In step S5, mobile device may request the user to provide a user input representative of characteristics, such as including a degree, of the perceived acoustic-noise induced discomfort. The user input may be in a number of forms. For example, the mobile device may guide the user through one or more questions of an electronic questionnaire or through steps of a wizard process. For example, the user may be requested to rate the level of discomfort on a predetermined scale and/or indicate characteristics of the discomfort or of the noise. The user may even be asked to provide a free text description of the discomfort. If one or more of the measurement steps S2 through S4 are performed at different times and/or locations, the process may likewise receive user feedback indicative of the perceived noise at said different times and/or locations.

If the received user input indicates that the level of discomfort is satisfactory, the process may terminate; otherwise the process proceeds at step S6.

At step S6, the process analyses the measured sound signal(s), the received operational parameters from the one or more pump assemblies and the user feedback so as to determine one or more adjusted control parameters for controlling one or more of the pump assemblies. If the process determines that the noise is unlikely caused by the water utility system or cannot be influenced by controlling a pump assembly or other components of the water utility system, the process may notify the user accordingly, e.g. via a display of the mobile device. For example, the process may perform a correlation analysis of the operational parameters and the measured sound signal, e.g. so as to determine whether the dominant spectral content of the sound signal is related to the pump assembly or one of a plurality of pump assemblies. When the dominant frequencies of the measured sound signal are unrelated to e.g. the rotational speed of the pump assembly/assemblies, the process may determine that the acoustic noise is unrelated to the water utility system. Similarly, the process may perform a feature extraction and noise classification process to determine a class of the measured noise. When the determined class of noise is unrelated to e.g. the operational state of the water supply system, the process may determine that the acoustic noise is unrelated to the water utility system.

The determination of the adjusted control parameters, e.g. the correlation analysis may at least in part be based on the location of the mobile device relative to the pump assembly, e.g. as defined by a distance to the pump assembly. The location information may be manually input by the user or it may be automatically be determined, e.g. by location tracking of the mobile device, signal strength of the communications link to the pump, and/or the like.

An example of a possible process for analyzing the sound signal will be described with reference to FIG. 4 below.

Still referring to FIG. 3, at step S7, the process controls the one or more pump assembly based on the adjusted control parameters, e.g. by transmitting the adjusted control parameters to the pump assembly.

The process then returns to step S3 and performs another iteration of acquiring operational parameters, sound measurements and user feedback so as to determine whether the level of discomfort has been reduced. For example, when the pump is running at certain speeds (rpm), resonance noise can occur in other parts of the water utility system or even in other structural parts of a building which are mechanically coupled to the water utility system. If the rotational speed matches a resonance frequency of the system or other structures, annoying noise may occur. Accordingly, the process may adjust the control parameters of the pump system so as to cause the pump system to not operate at rotational speeds that correspond to the dominant frequencies of the measured sound signal. This process may be repeated several times until the discomfort has reached a satisfactory level or until the process determines that no further reduction of the discomfort can be achieved by adjusting control parameters.

In some embodiments, the process may communicate some or all of the acquired and/or processed data, user feedback and information about the adjustments to the control of the system to a remote host system. Accordingly, the remote host system may collect data from multiple water utility systems and use the collected data to refine the best actions (policy) given the feedback across multiple installations/systems. This refinement may be done automatically, e.g. using machine learning, or at least partly based on user input.

Figure 4:
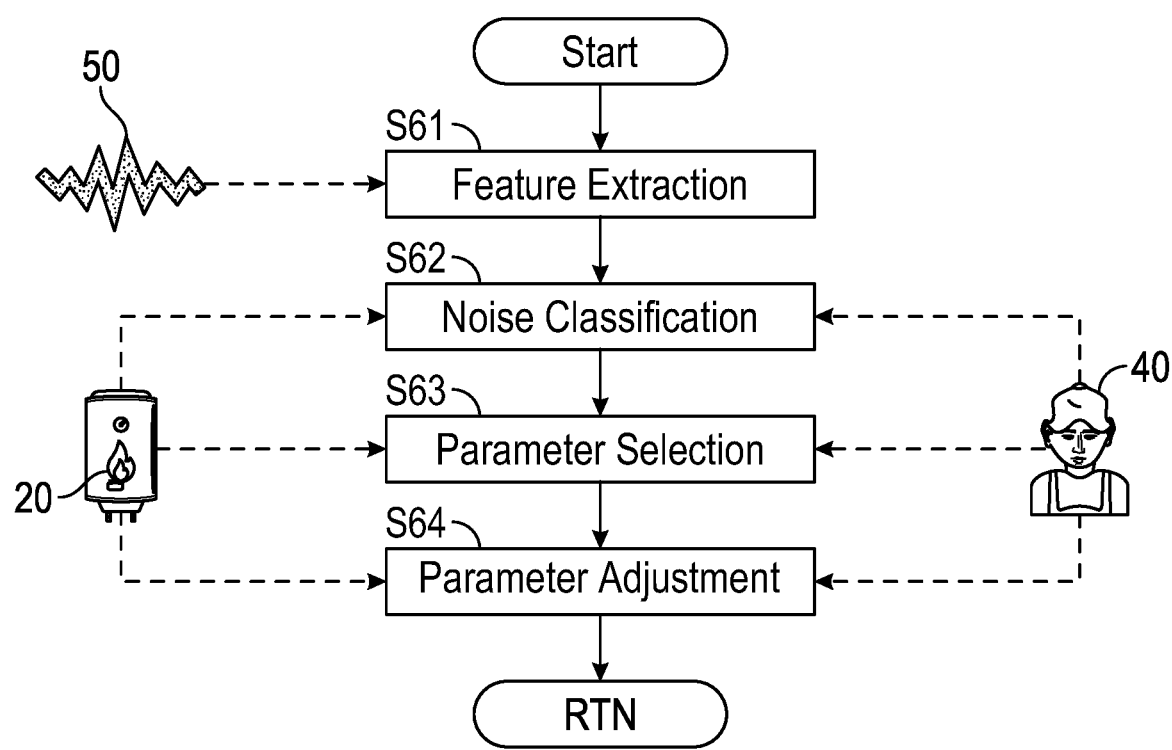
FIG. 4 illustrates a process of determining parameter adjustments based on a measured sound signal.

FIG. 4 illustrates a process of determining parameter adjustments based on a measured sound signal.

In step S61, the process performs a feature extraction step on the measured sound signal 50. The feature extraction process may extract a plurality of features—also referred to as an acoustic signature—from the measured sound signal. The feature extraction process may use any method for extracting features from acoustic signals known as such in the art, e.g. principal component analysis, etc. The feature extraction may be performed in the time domain, frequency domain and/or time-frequency domain. Feature extraction in the time domain may e.g. use the energy envelop of the signal to extract acoustic features. Alternatively or additionally, the number of zero crossings of a signal within a time interval may be used. Feature extraction in the frequency domain may employ techniques such as Fast Fourier Transform and/or Power Spectral Density (PSD). Suitable techniques for extracting features in the time-frequency domain include Short Time Fourier Transform (STFT) and Wavelet Transform (WT).

In step S62, the process determines a noise class based on the extracted features. To this end, the process may employ a suitable classifier. A classifier provides the functions or rules that are used to divide the feature space into various regions, where each region belongs to a particular noise class. Generally, classifiers can be categorized as parametric and nonparametric classifiers, based on the knowledge of signal distribution parameters. A parametric classifier is one which can be represented in closed form i.e. some assumptions are made about the probability density function for each class whereas in non-parametric classifiers no assumptions are made about density function. Examples of suitable classifiers include a Bayesian Classifier, a Support Vector Machine, a Gaussian Mixture Model, a Hidden Markov Model, an Artificial Neural Network, a Decision Tree, a Fuzzy Logic Rule-Based classifiers, or combinations thereof.

The classifier receives the extracted features, e.g. in the form of a feature vector.

In some embodiments, the classifier may additionally receive one or more operational parameters indicative of the current operational state of the pump system 20, e.g. a current pump speed, voltage, drive frequency, mode of operation, etc.

Alternatively or additionally, the classifier may additionally receive one or more inputs from a user 40, e.g. indicative of the location of the perceived noise, indicative of a subjective classification or rating of the noise by the user, e.g. an indication of the degree of the perceived noise, and/or the like.

In step S63, the process selects one or more control parameters of the pump system to be adjusted. The selection of the parameters to be adjusted may be based on the determined noise class. Optionally, the selection of the parameters to be adjusted may further be based on additional inputs, in particular on the current operational parameters of the system and/or on user input. The selection may be performed by a rule-based system, by a machine-learning model such as an artificial neural network or a combination thereof.

In step S64, the process determines a specific adjustment of the selected parameters. As the previous step, this determination may be based on the determined noise class and, optionally, on further inputs such as on the current operational parameters of the system and/or on user input. The determination may be performed by a rule-based system, by a machine-learning model such as an artificial neural network or a combination thereof.

It will be appreciated that, in some embodiments some of the above steps may be combined into a single step or implemented by the same rule-based and/or machine-learning model. For example, a multi-layer neural network may be used where one or more initial layers perform feature extraction and one or more subsequent layers perform classification and parameter selection tasks.

Figure 5:
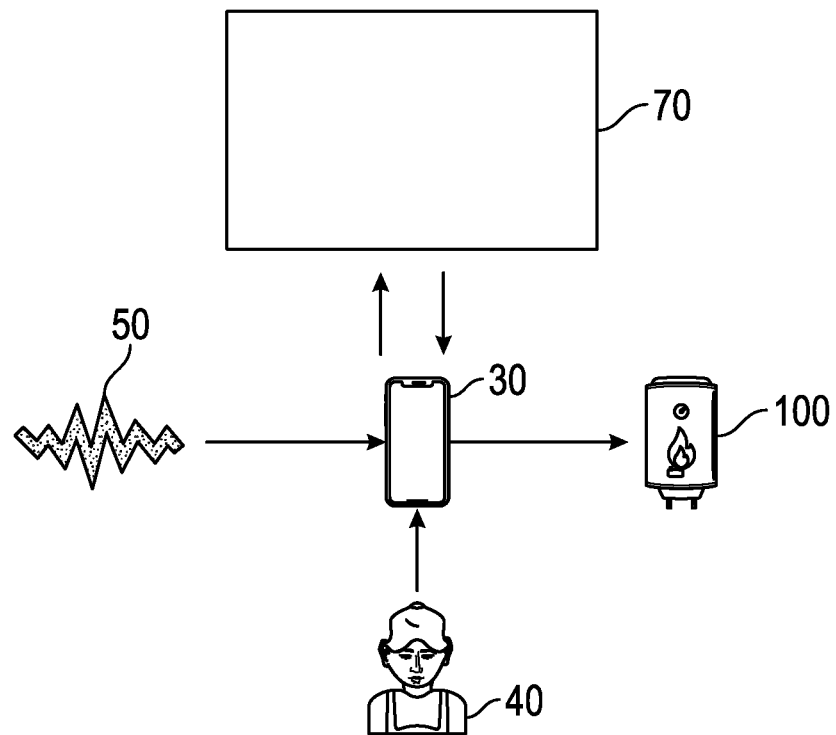
FIG. 5 illustrates another process of controlling a water utility system.
Figure 6:
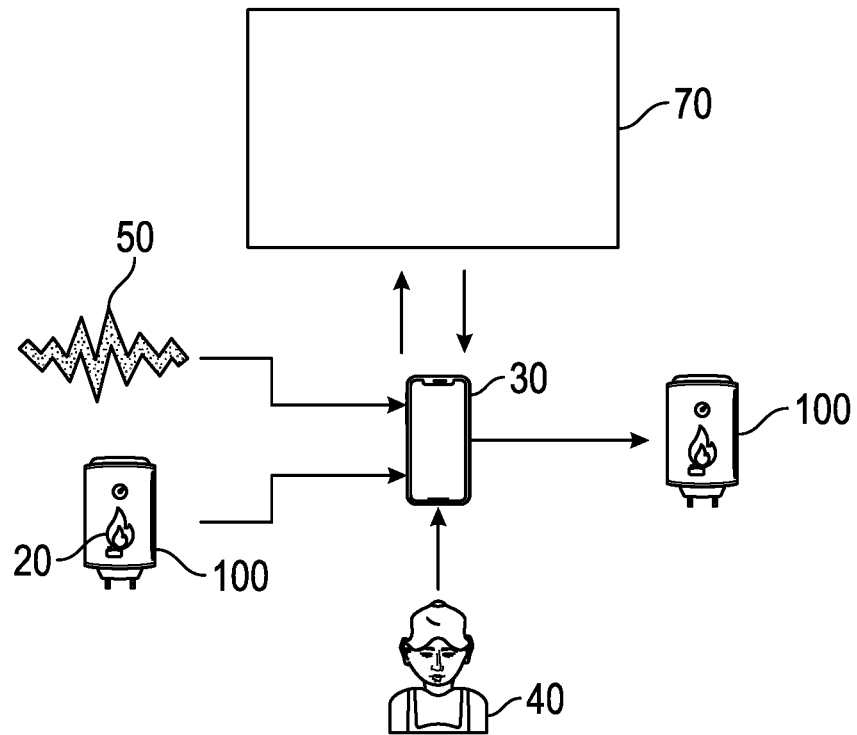
FIG. 6 illustrates yet another process of controlling a water utility system.

FIGS. 5 and 6 illustrate examples of a process of controlling a water utility system. In particular, FIGS. 5 and 6 illustrate an example of how a process may be distributed between a mobile device 30 and a remote host system 70, e.g. of a system as described with reference to FIGS. 1 and/or 2.

The processes of FIGS. 5 and 6 the process determines a control strategy to be applied in a given situation, i.e. for a given set of inputs, such that the perceived noise discomfort is minimized. The inputs may include one or more of the following: A computed acoustic metrics and/or signature, a location, building information, user information etc. To this end, the process may utilize reinforcement learning (see e.g. Richard S. Sutton and Andrew G. Barto. 1998. Introduction to Reinforcement Learning (1st ed.). MIT Press, Cambridge, MA, USA). Generally, reinforcement learning seeks to learn a good policy, i.e. to learn taking an action given the current state, in order to maximize some reward. In the present embodiment, the state may be defined by the computed acoustic metrics and/or signature along with optional additional information (location, building information, user information etc.). The set of actions that may be taken are defined by different control strategies and the reward signal being the user feedback, which may be represented by a single scalar value, and which may represent an indication of how the noise discomfort has been improved by a given action. In one particular embodiment, Q-learning may be applied. As reinforcement learning may require relatively much interaction (trials) to learn a good policy, some embodiments may perform a reinforcement learning process, e.g. a Q-learning process, across a plurality of users and/or across a plurality of systems, i.e. all data is collected in a single pool and a single policy is then learned, which is then applied to all users/systems. Accordingly, the reinforcement learning process may advantageously be implemented by a central host system, e.g. as shown in FIGS. 5 and 6.

The system of FIG. 5 is similar to the system described in connection with FIG. 2 and comprises a mobile device 30 and a host system 70. The mobile device 30 is communicatively coupled to the remote host system, all as described in connection with FIG. 2.

During operation, the mobile device 30 records a sound signal 50. The mobile device 30 further implements a process for determining adjusted control parameters based on the recorded sound signal. For example, to this end, the mobile device may implement a process as described in connection with FIGS. 3 and/or 4. In particular, the mobile device may compute one or more metrics and/or signature of the recorded sound signal and feed the computed metrics/signature into a computational model implementing a control strategy. Optionally, the mobile device may further feed additional information into the computational model such as location information, user information (e.g. the age of the user), etc. Yet further, the mobile device may feed an input received from a user 40 into the computational model where the input is indicative of a property of the perceived noise, e.g. indicative of a degree of discomfort, a perceived loudness and/or the like. The computational model may e.g. include a classifier and a subsequent parameter selection and adjustment stage, e.g. as described in connection with FIG. 4. At least a part of the determination of the control parameters may be performed by the remote host system 70. To this end, the mobile device 30 may transmit the recorded audio and/or the extracted acoustic metrics/signature and, optionally, the additional information, to the remote host system 70 along with the received user input. The remote host system may then return a determined control strategy for adjusting selected control parameters.

In any event, the mobile device then controls the water utility system 100 based on the determined control parameters. The mobile device further receives input from the user 40 indicative of a perceived noise or indicative of a change of the experienced noise in response to the implemented change in control parameters. The user input may thus serve as a reward in a reinforcement learning process.

The mobile device may transmit the received user input to the remote host system 70. If the mobile device has not already done so in a previous step, the mobile device transmits the recorded audio and/or the extracted acoustic metrics/signature and, optionally, the additional information, to the remote host system 70 along with the received user input.

The remote host system 70 implements a reinforcement learning process based on the sound signal and/or computed metrics/signature and, optionally, the additional information as input representing the state of the system and based on the user input representing the reward. The remote host system 70 receives corresponding data from multiple mobile devices and/or data associated with multiple users and/or multiple water supply systems. The remote host system applies reinforcement learning to learn an optimized policy (i.e. an optimized selection and adjustment of control parameters) given the input and reward feedback across multiple systems and/or users. The remote host system may then transmit an updated model (implementing an updated control strategy) to the mobile device for future use by the mobile device when analysing a subsequent sound signal. Alternatively, in embodiments where the model is applied by the remote host system, the remote host system may not need to transmit the updated model to the mobile device but merely apply the updated model responsive to receiving a subsequent set of inputs.

FIG. 6 illustrates a similar process of controlling a water utility system. The process is similar to the process described in connection with FIG. 5, except that in this embodiment the additional information on which the control strategy is based further includes one or more operational parameters of the pump assembly 20 of the water utility system 100, e.g. a pump speed, pressure measurements, temperature measurements and/or the like. Accordingly, the mobile device further receives one or more operational parameters from the pump assembly 20.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage. It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method for controlling one or more components of a water utility system, the water utility system including at least one pump assembly, the method comprising:

receiving a user indication indicative of a user-perceived acoustic-noise induced discomfort experienced at least at a first location that is in a remote location with respect to the location of the at least one pump assembly, the received user indication comprising at least one of a user indication of a degree of the user-perceived acoustic-noise induced discomfort and a user indication of an attribute of an acoustic noise causing the user-perceived acoustic-noise induced discomfort;

measuring at least a first sound signal at said first location where the acoustic-noise induced discomfort has been perceived by the user;

determining, based on the measured first sound signal, the received user indication, and a received first operational parameter of the at least one pump assembly, the first operational parameter being representative of an operational condition of the at least one pump assembly at the time of said measuring the first sound signal, one or more adjusted control parameters of the water utility system, wherein determining comprises determining correlations between the received first operational parameter of the at least one pump assembly and the measured first sound signal; and controlling the water utility system based on the determined adjusted control parameters by adjusting an operational condition of the at least one pump assembly.

2. A computer-implemented method according to claim 1, further comprising receiving a user indication indicative of a user-perceived change of the noise discomfort experienced at least at the first location.

3. A computer-implemented method according to claim 2, further comprising repeating the measuring, obtaining, determining and controlling responsive to the received user indication.

4. A computer-implemented method according to claim 1, further comprising obtaining at least the first operational parameter, and wherein determining the one or more adjusted control parameters of the water utility system includes processing the measured first sound signal and said obtained first operational parameter to determine a correlation between the operational condition and the measured first sound signal and determining the one or more adjusted control parameters of the water utility system based on said processing.

5. A computer-implemented method according to claim 1, further comprising measuring at least a second sound signal at said first location subsequent to said measuring the first sound signal, wherein determining the one or more adjusted control parameters of the water utility system is further based on the measured second sound signal.

6. A computer-implemented method according to claim 5, further comprising obtaining at least one second operational parameter of the at least one pump assembly representative of an operational condition of the at least one pump assembly at the time of said measuring the second sound signal, wherein determining the one or more adjusted control parameters of the water utility system is further based on the measured second sound signal and on said obtained second operational parameter.

7. A computer-implemented method according to claim 1, further comprising measuring at least one additional sound signal at a second location, different from the first location, wherein determining the one or more adjusted control parameters of the water utility system is further based on the measured additional sound signal.

8. A computer-implemented method according to claim 7, further comprising obtaining at least one supplemental operational parameter of the at least one pump assembly representative of an operational condition of the at least one pump assembly at the time of said measuring the additional sound signal, wherein determining the one or more adjusted control parameters of the water utility system is further based on the measured additional sound signal and on said obtained supplemental operational parameter.

9. A computer-implemented method according to claim 1, wherein receiving a user indication includes receiving a descriptive characterization of the user-perceived noise discomfort and wherein at least one of processing and the determining is based on the received descriptive characterization.

10. A computer-implemented method according to claim 1, wherein the determining is based at least in part on stored data indicative of known correlations between operational conditions and sound signals.

11. A computer-implemented method according to claim 1, wherein determining is based on at least one of a decision tree, an expert system, and a machine learning algorithm.

12. A computer-implemented method according to claim 1, wherein the first operational parameter includes one or more of a pump speed, a valve setting, a voltage, and a frequency.

13. A computer-implemented method according to claim 1, further comprising determining at least a first set of adjusted control parameters and a second set of adjusted control parameters; and wherein controlling includes selecting one of the first and second sets of control parameters conditioned on one or more of a user input, a time of day, a day of week, and an operational state of the water supply system.

14. A computer-implemented method according to claim 1, wherein a first control parameter includes one or more of a pump speed, a valve setting, a voltage, and a frequency.

15. A computer-implemented method according to claim 1, wherein the water utility system includes two or more pump assemblies, and wherein the method further comprises obtaining respective operational parameters from each of the pump assemblies and wherein determining adjusted control parameters includes determining adjusted control parameters for at least one of said pump assemblies.

16. A computer-implemented method according to claim 15, wherein determining adjusted control parameters includes determining adjusted control parameters for at least two of said pump assemblies.

17. A data processing system configured to perform the acts of the method according to claim 1.

18. A water utility system comprising at least one pump assembly and a data processing system according to claim 17.

19. A non-transitory computer readable medium storing a computer program configured to cause a data processing system to perform the acts of the computer-implemented method according to claim 1.

20. A computer-implemented method according to claim 1, wherein the first location is a location of a mobile electronic device being operated by the user.

21. A computer implemented method according to claim 20, further comprising instructing the user to move a microphone of the mobile electronic device to the first location.

22. A method according to claim 1, wherein determining the correlations comprises determining a correlation between a change of the measured sound signal over time and a corresponding change of the operational parameter and/or the degree of the perceived noise over time.

23. A method according to claim 1, wherein determining the one or more adjusted control parameters comprises processing the measured first sound signal to extract one or more features of the first sound signal, mapping the extracted one or more features to one or more classes of noise based on a classification of the noise by the source of noise and/or by the type of noise, and mapping the one or more classes of noise to which the extracted features have been mapped to one or more candidate control parameters to be adjusted.

24. A method according to claim 1, further comprising computing one or more metrics and/or signatures of the first sound signal and feeding the computed metrics/signature into a computational model implementing a control strategy.

25. The computer-implemented method of claim 1, wherein the user-perceived acoustic-noise induced discomfort experienced at the first location includes a resonance noise created by resonant coupling between the at least one pump assembly and a water utility system or building structural component that is mechanically coupled to the at least one pump assembly.

26. The computer-implemented method of claim 1, wherein the user-perceived acoustic-noise induced discomfort experienced at the first location is dependent on a rotational speed of the pump of the at least one pump assembly.

* * * * *